C. HARTMANN.
Horseshoes.
No. 163,997.
Patented June 1, 1875.
2 Sheets--Sheet 1.
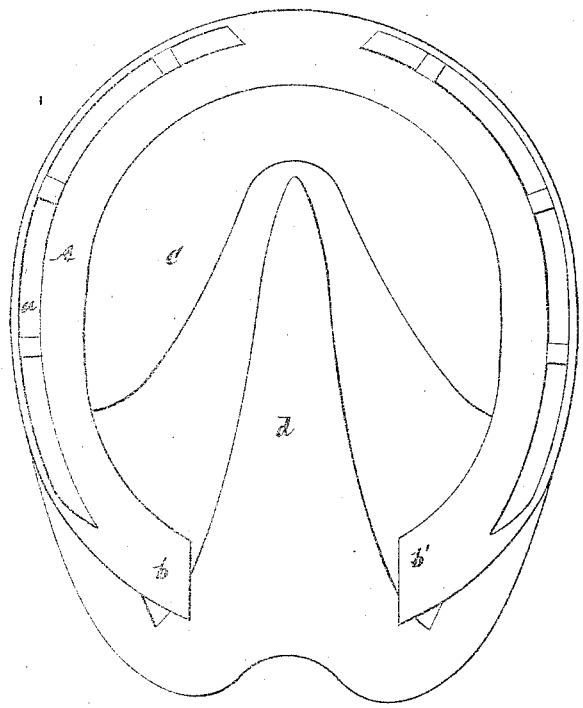
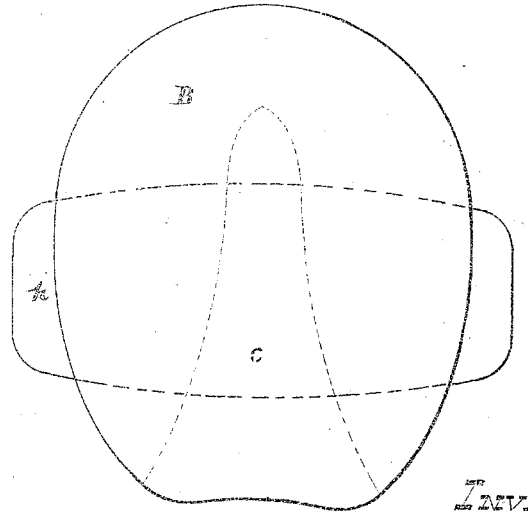
WITNESSES
Otto Hufeland
Chas. Nahlen
INVENTOR.
Christian Hartmann
pr
Van Santvoord & Hauff
Attys 2 Sheets--Sheet 2.

C. HARTMANN.
Horseshoes.

No. 163,997. Patented June 1, 1875.

WITNESSES.
Otto Hupeland
Chas Wahlen

INVENTOR.
Christian Hartmann
pr
Van Santvoord & Hauff
attrs

UNITED STATES PATENT OFFICE.

CHRISTIAN HARTMANN, OF HANOVER, GERMANY.

IMPROVEMENT IN HORSESHOES.

Specification forming part of Letters Patent No. 163,997, dated June 1, 1875; application filed April 17, 1875.

*To all whom it may concern:*

Figure 3:
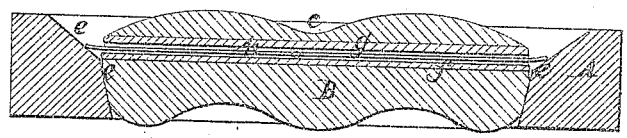
Figure 4:
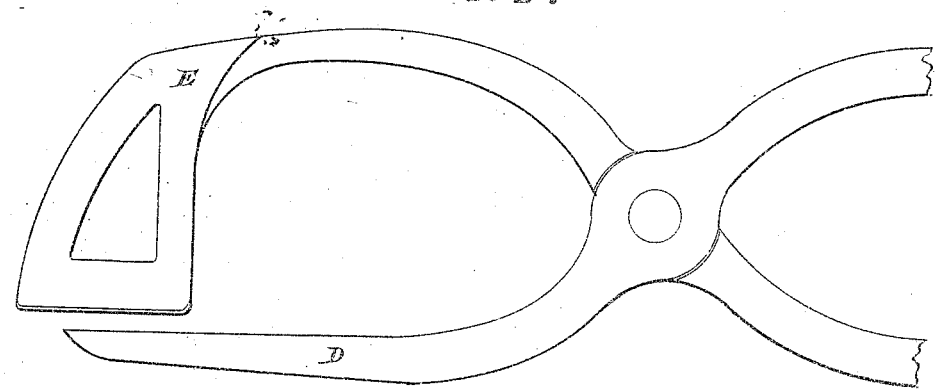

Be it known that I, CHRISTIAN HARTMANN, of Hanover, Germany, have invented a certain new and Improved Buffer for Horseshoes, of which the following is a specification:

This invention is illustrated in the accompanying drawing, in which Figure 1 shows a horseshoe applied to a horse's hoof. Fig. 2 shows my buffer detached. Fig. 3 is a transverse section of the buffer and the horseshoe. Fig. 4 shows a pair of tongs.

Similar letters indicate corresponding parts.

My invention is based upon the fact that a horse's hoof has been by nature formed in such a way that the entire lower surface may be made to conduce to its support; and the purpose of my invention is to reproduce this state through the medium of the horseshoe, as well as to obtain various other advantages, which will be hereinafter set forth.

My invention consists in combining, with a horseshoe, what I denominate a buffer, which is constructed of vulcanized caoutchouc, or other similar material, and is fitted between the shoe and to the frog of a horse's hoof, in such a manner that when the buffer is secured in place the entire lower surface of a horse's hoof is brought to bear on the ground.

My buffer is combined with a horseshoe which has a chamfered inner edge, whereby the buffer is held in place when it, together with the shoe, is secured to the horse's hoof. The horseshoe is provided with stops on one or both of its ends, whereby the buffer is prevented from sliding out of place. In order to insure the retention of the buffer, I combine therewith one or more springs of sheet metal, projecting on the edge of the buffer, in such a manner as to be adapted to catch under the horseshoe. The spring is contained in a slit formed in the buffer, and which is lined with fibrous or textile fabric, in order to prevent undue widening or tearing of the slit.

In the drawing, the letter A designates a horseshoe, which has the ordinary shape or form, and a channel, $a$, to receive the heads of the shoe-nails. The respective ends of this shoe are bent inward, as shown at $b\ b'$, Fig. 1, for the purpose of forming stops, which prevent a movement of the buffer, next described. The buffer B is provided with a slit, $f$, extending in the direction of its breadth, and which is strengthened by a lining, $g$, of linen, or other fibrous or textile material. This lining is preferably attached to the slit by means of a solution of caoutchouc, so that in the process of vulcanizing the buffer an intimate and solid unison takes place between the fabric and the sides of the slit. Into the slit $f$ I place a strip, $h$, of elastic metal, (spring-steel being the most preferable,) the length of which is somewhat greater than the width of the buffer, so that it projects on the same, while the breadth of the strip is a little greater than that of the slit, so as to avert dislocation. The projecting portions of the strip or spring $h$ are intended to catch into the groove $e$ of the horseshoe, or to be secured under the shoe, in order to insure the retention of the buffer.

In the operation of securing or of removing the buffer B I employ a pair of tongs such as represented in Fig. 4, and which are made especially for this purpose.

The operation of setting the buffer is as follows: I clasp the buffer B by the two jaws of the tongs, one jaw, D, thereof being placed into the cavity $c$, designed to receive the frog $d$, while the two claws of the other jaw, E, clasp the opposite surface of the buffer near its edges. If the tongs are now tightly closed the buffer, together with the spring $h$, is bent, and in this condition it is introduced into the space between the horseshoe A, being adjusted so that the projections of the spring $h$ take their proper positions. The jaws of the tongs are then removed, whereupon the buffer expands and retakes its original form, and by this means the buffer is pressed against the frog $d$, and against the sole of the hoof, in which position it is tightly held.

I have found by experience that no dislocation of my buffer takes place under any circumstances. Its displacement toward the hinder part of the shoe is avoided by the stops $d\ d'$. On the other hand, it is very easy to remove the buffer by means of the tongs before referred to.

My buffer has the advantage that it gives to a horse a sure footing, while it prevents "balling" of the hoof with snow.

Another great advantage of my buffer consists therein that a most simple form of shoe may be used, and which the most awkward farrier is able to make.

What I claim as new, and desire to secure by Letters Patent, is—

The combination of the buffer B, having slit $f$, with lining $g$ of textile fabric, retaining-spring $h$, and shoe A, substantially as herein set forth.

In testimony that I claim the foregoing I have hereunto set my hand this 22d day of February, 1875.

CH. HARTMANN.

Witnesses:
OTTO DAVISSON,
T. ASCHER.